Feb. 1, 1927.
W. H. BAHAN
1,616,406
CRANK SHAFT GEAR FOR LOOMS
Filed Nov. 25, 1925
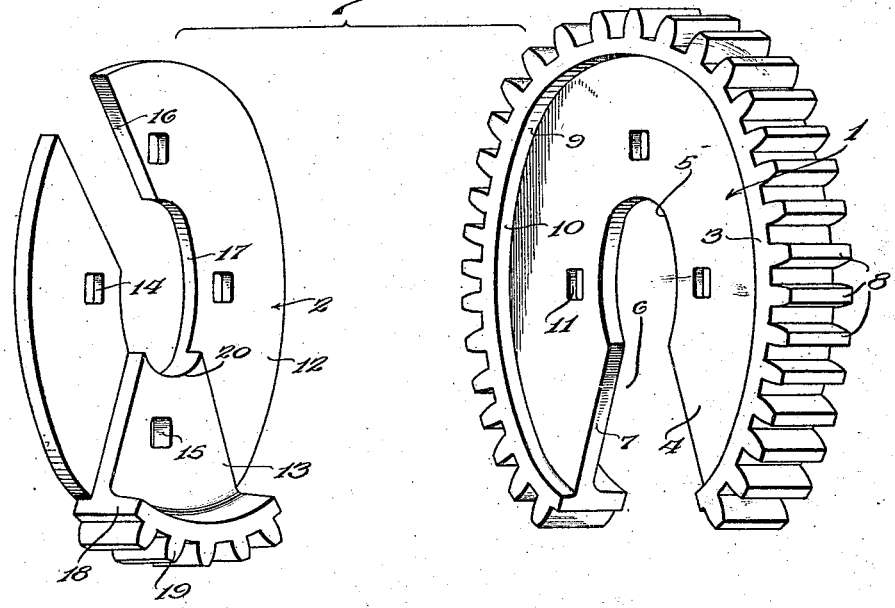
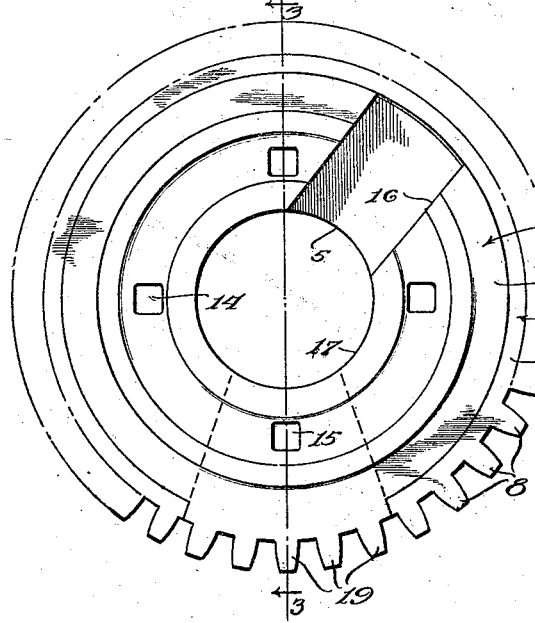
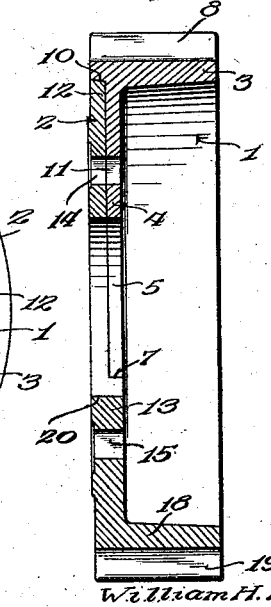
Inventor
William H. Bahan
By
Lacey & Lacey, Attorneys Patented Feb. 1, 1927.

1,616,406

UNITED STATES PATENT OFFICE.

WILLIAM H. BAHAN, OF GREENVILLE, SOUTH CAROLINA.

CRANK-SHAFT GEAR FOR LOOMS.

Application filed November 25, 1925. Serial No. 71,494.

This invention relates to gears and more particularly to an improvement in crank shaft gears for looms.

It is a well known fact that the crank shaft gear of a loom is subjected to very considerable wear for a portion of its periphery and that the teeth of the gear which are located at this portion thereof soon become worn or broken, thereby necessitating the removal of the gear and the substitution of a new one. Ordinarily, this has required the taking down of the crank shaft and this, of course, involves considerable time and labor. Furthermore, such gears, where made in one piece, are discarded, although only a portion of the periphery of the gear is worn to any considerable extent. Therefore, the present invention has as its general object to provide a crank shaft gear for looms which may be removed without the necessity of taking down the crank shaft, and which gear embodies a major section and a minor section, the latter section including a segment which, when in place, completes the toothed periphery of the gear as a whole and which segment constitutes the part of the gear the teeth of which are subjected to the greatest wear, so that when the part becomes worn it alone requires to be replaced and it, therefore, is not necessary to discard the entire gear.

Another object of the invention is to so construct the gear that a new segment may be substituted for a worn one without the necessity of removing the major section of the gear or disturbing the crank shaft.

Another object of the invention is to so construct the two sections of the gear that there will be no likelihood of disarrangement of the segment section or any looseness or play thereof, means being provided for securing the sections together in such a manner that the segment section is substantially as securely united to the major section as though it were an integral part thereof.

In the accompanying drawings:

Figure 1 is a group perspective view illustrating the two sections of the gear embodying the invention relatively separated.

Figure 2 is a side elevation of the gear with the two sections thereof assembled.

Figure 3 is a vertical sectional view through the gear, taken substantially on the line 3—3 of Figure 2.

As before stated, the gear embodying the invention comprises a major section and a minor or segment section, which sections are indicated in general respectively by the numerals 1 and 2. The major section 1 of the gear comprises a rim 3 and a web 4 which is peripherally surrounded by the rim, the said web 4 having a central approximately circular opening 5 formed therein and at one side of this opening being cut away to provide a radially extending recess 6, the opposite side walls of which, indicated by the numeral 7, are extended along diverging lines in the direction of the periphery of the section. The rim 3 is provided with the usual gear teeth 8 which, of course, extend in a series circumferentially of the rim from end to end thereof. The web 4 is preferably located in a plane spaced inwardly a slight distance from one side of the rim so as to provide a recess 9 in one face of the gear section, and the wall 10 of this recess is preferably slightly beveled as shown in the drawings. The web is formed with a plurality of openings 11, ordinarily three in number, and spaced apart at approximately 90°, so that two of the openings are located at opposite sides of the opening 5 and the third opening is located opposite the opening 5 and diametrically opposite the recess 6.

The segment section 2 of the gear comprises a flatsided approximately circular body 12, the periphery of which is slightly beveled, and this body is of a diameter to fit snugly within the recess 9, the periphery of the body snugly fitting the beveled wall 10 of the said recess 9, when the sections are assembled. The body 12 is formed upon one face with a boss 13 of a thickness equal substantially to the thickness of the web 4 of the gear section 1 and of approximately segmental form so that its opposite diverging edges will have wedging engagement in the recess 6 when the gear sections are assembled. It will be observed by reference to Figure 3 of the drawings, that not only is the boss 13 of a thickness equal substantially to the thickness of the web 4, so that its face will be flush with the face of the gear section 1 opposite the face in which the recess 9 is provided, but likewise, the body 12 of the segment section 2 is of a thickness equal substantially to the depth of the recess 9 so that its face will be flush with the corresponding side of the rim 3, when the parts are assembled. The body 12 is formed with openings 14 which are designed to register with the openings 11 when the two sections of the gear are assembled, and said body and the boss 13 are formed with an opening 15 which is located substantially at 90° from the two first mentioned openings 11 of the gear section 1. The body 12 of the gear section 2 is formed with a radial recess 16 which may have parallel walls and which extends from an approximately circular opening 17 formed axially in the said body 12, through the periphery of the said body and between two of the openings 14. The boss 13 is formed with a rim portion 18 which, when the sections are assembled, matches and constitutes a continuation of the rim 3 of the gear section 1, and this rim portion is provided with gear teeth 19, which teeth, together with the teeth 8 of the gear section 1, complete the continuous series of gear teeth.

In applying the gear, the gear section 2 is fitted over the crank shaft of the loom and disposed against the side of the tight or fastened pulley or the friction plate upon the said shaft, and the section 1 is then fitted over the crank shaft and assembled with the section 2. Bolts are then secured through the registering openings of the two sections and through the opening 15, to secure the gear to the said pulley or friction plate. It will be observed by reference to Figure 2, that when the sections are assembled, the recess 16 is closed or spanned by the web of the section 1 so that a truly circular opening is provided axially of the gear as a whole, the boss 13, at its inner end, being of arcuate form, as indicated by the numeral 20, to conform to the wall of the opening 17.

It will be understood that the segment 18 of the gear section 2 is the portion of the gear which receives the greatest wear and it will, therefore, be evident that when the teeth of this segment become worn or broken, the section 2 may be readily separated from the section 1 and from the crank shaft without disturbing the latter and a new section 2 substituted therefor. It will be evident from an inspection of the drawings and the foregoing description that all four of the securing bolts which are ordinarily employed in securing a one-piece gear to the tight pulley or friction plate upon the crank shaft of a loom, are secured through the segment section 2 of the gear of the present invention and that three of said bolts are secured also through the major section 1 of the gear, so that the gear as a whole is as substantial and rigid as the ordinary integral one-piece gear. Furthermore, due to the wedging engagement of the boss 13 in the recess 6, and the similar engagement of the body 12 in the recess 9, the gear is rendered very substantial.

Having thus described the invention, what I claim is:

1. A gear of the class described comprising a section comprising a web having a shaft-receiving opening and a recess extending therefrom and through the periphery of the web, the walls of the recess being diverged outwardly, and a toothed rim extending about the periphery of the web and terminating at the recess at the opposite sides thereof, the web being spaced inwardly from one side of the rim to provide a recess at the corresponding face of the said section, the wall of the recess being inclined, the said web being provided with openings for the passage of securing elements and said openings being arranged about the said shaft receiving opening therein, and a segment section comprising a substantially circular body having a beveled periphery, the said body being fitted within the recess with its said periphery snugly fitting the wall of the recess in the face of the first mentioned section, the said body having a shaft-receiving opening and a recess extending therefrom and through the periphery of the body, said body having openings therein registering with the openings in the web of the first mentioned section for the passage of securing elements, the body having a boss upon its face extending between the shaft-receiving opening and the periphery of the body, the boss at its inner end being of arcuate form to constitute a part of the wall of said shaft-receiving opening, the said boss being of increasing width from its inner to its outer portion and fitting snugly between the walls of the recess in the first mentioned section, the boss being provided at its outer portion with a toothed rim portion extending between the ends of the rim of the first mentioned section and being provided with an opening for the passage of a securing element.

2. A gear of the class described comprising a section having a web and an overhanging rim to provide a recess, said web having a central shaft receiving opening and a radially disposed recess extending therefrom to the rim, and a companion section comprising a substantially circular body having a shaft receiving opening and a radially disposed recess extending therefrom to its rim, said body having a boss corresponding in shape to the recess of the first named section, said boss being adapted to fit into the recess of the first named section when the body is engaged in the first named recess of the first named section with its periphery engaged with the inner wall of the overhanging rim, and means for securing the body and web in mutual contact with the central openings thereof in registration.

In testimony whereof I affix my signature.

WILLIAM H. BAHAN. [L. S.]